Patented Sept. 25, 1951

2,569,399

UNITED STATES PATENT OFFICE 2,569,399

FIRE RESISTANT ASPHALT COATING

Frank B. Burns, Chicago, Ill., and Millard S. Larrison, Frankford, Pa., assignors to United States Gypsum Company, Chicago, Ill., a corporation of Illinois No Drawing. Application August 7, 1943, Serial No. 497,869

15 Claims. (Cl. 106—282)

This invention relates to a coating composition for surfaces, which is not only resistant to normal exposure conditions but also is highly resistant to fire, thereby protecting combustible material over which it may be applied.

The coating composition, prepared in accordance with this inventiion, and whch will be subsequently described in detail, has many applications. It is particularly adapted for use in asphalt composition roofing as a protective coating.

The regular commercial type of composition roofing, which consists of mineral granules applied to a surface coating on an asphalt saturated roofing felt base, when exposed to fire, will in a short time start to flow, and become practically ineffective as a fire barrier. In fact, tests show that instead of supplying a barrier to fire, it actually aids since it is combustible.

In order to determine the suitability of roofing material as a fire barrier, the Underwriters' Laboratories, an organization supported by Fire Underwriters, have devised tests to show the merit of a roofing material when in use as a fire barrier. These tests are so designed that they will bring out the true performance of a roofing material during a fire. There are three tests which are known as "Burning Brand," "Flame Propagation" and the "Direct Flame" tests.

Under these tests, developed by the Underwriters' Laboratories, it can be demonstrated that the coating composition currently used in the manufacture of composition roofing will soften and flow down the roof almost as freely as water thus adding fuel to the flame below with the continued application of the flame. This is illustrated best by the "Flame Propagation test" wherein the burning area spreads rapidly up the supporting deck to envelop the entire area covered by the composition roofing. This test clearly shows the marked disadvantages of the present type of asphalt composition roofing material. Likewise, when the "Burning Brand test" is used, the area under the brand is completely eroded of protective mineral granules by the free flow of the molten roofing asphalt. Thus the base felt is exposed and offers no further protection to the structure.

It is therefore but one of the many objects of this invention to disclose means by which a composition may be made which, when applied to combustible material such as asphalt roofing felt, will not only supply adequate protection from atmospheric weather conditions but will also be greatly improved in its resistance to fire.

It is an object of this invention to produce a coating composition which is non-flowing, flame resistant, plastic and predominantly bituminous in composition, especially suited for the manufacture of covering elements of the composition type.

It is also a further object of this invention to provide a coating composition which, when applied to an especially prepared roofing felt, will enable the roofing so formed to meet certain Underwriters' Laboratories' requirements of fire resistance hitherto unttainable in roofing of this class.

It is still further an object of this invention to provide a coating composition which does not flow or run, and which exhibits substantially no cracking when subjected to a burning brand or fagot for a sufficient time to consume the brand or fagot completely.

Additional objects will occur to those skilled in the art of which this invention is a part.

The coating composition prepared in accordance with this invention is so designed that it becomes a tough, cohesive, continuous inorganic covering after it has been once exposed to heat or direct flame for a period of time sufficiently long to completely burn out the organic constituents of the coating composition. If the heat or flame is applied for a sufficient length of time to burn out all or substantially all of the cementitious organic composition, there will still remain a continuous, cohesive ash, capable of retaining its shape and continuity even when exposed to a wind having a velocity up to 12 miles per hour, when it is supported on a roof deck having a slope of about 5 inches per lineal foot. This test is of particular significance since the ash protects the substructure. The composition is further designed to resist or accommodate thermal stresses or strains caused by the burning brand or fagot on the surface of the roofing so that substantially no cracks develop in the body of the roof coating.

In addition, a coating composition prepared in accordance with this invention is well suited for application to composition roofing, and will not materially flow on slopes up to 50 degrees when exposed to a direct gas flame having an estimated temperature of approximately 1600 to 1800 degrees Fahrenheit. Also, when granules are applied to this coating, they will adhere to its surface sufficiently so that, during the application of the flame, they will not be removed until substantially all of the cementing organic constituents of the coating composition are destroyed by fire.

This coating composition, when applied to composition roofing, is also sufficiently fire resistant to inhibit the spread of flame up a roof deck even when fanned by a 12 mile per hour wind. The flame spread of this composition meets the Underwriters' Laboratories' requirements for a class "A" label service for the "Flame Propagation test."

The product of this invention is obtained by a novel combination of a bituminous binding material, such as asphalt, with materials which will tend to form a crust or which will destroy any marked tendency for the asphalt to flow. Not all combinations of these various materials will give effective results, for only by following the principles set forth in this invention can a satisfactory product be obtained. In practicing this invention, it is necessary to form a proper blend of the waterproof binding material with the inorganic incrustating and flow preventing materials. If this is not done, weather resistance may be sacrificed to obtain the fire protection and the product formed would not have commercial utility. By following the procedure, which will be set forth in the examples, it is possible for anyone skilled in the art of which this invention is a part, to carry out the essential principles of this invention.

In the forthcoming example only three particular types of asphalts are used. It is to be understood that other asphaltic materials or materials having equivalent properties can be substituted and will not depart from the scope of this invention. When the words "asphalt" or "asphaltic material" are used in this invention, it is intended to cover by such term all bituminous materials as a class which are used or are suitable for roofing purposes.

Any material which will intumesce and form a crust during heating and decrease and prevent the flow of the superheated asphalt is suitable in carrying out the principle of this invention. It has been found that a certain quality and quantity of asbestos serves the purpose very well when associated with materials such as ground unexpanded vermiculite, ground bituminous coal, capable of coking, though other equivalent materials may be used satisfactorily. The usual mineral filler incorporated in the common coating ordinarily applied to composition roofing can also be incorporated in the coating composition made in accordance with this invention. Adjustments in the amount required can be readily made for the amount of active ingredients used. Fillers such as powdered limestone, flaked slate dust, ground clay, calcined dolomite, etc., can be used. However, it is possible to replace all of this filler material with the crust forming or flow prevention material and still be within the scope of this invention. The active materials may include asbestos, ground bituminous coal, ground unexpanded vermiculite, etc. These materials are blended with the asphalt coating and applied to the surface which is to be protected, such as a saturated roofing felt sheet.

The following examples are given merely as illustrative of various ways of carrying out this invention without in any way limiting the scope thereof.

EXAMPLE 1

| | Parts by weight |
|---|---|
| Coating asphalt | 61.5 |
| Asbestos fiber | 15.4 |
| Ground bituminous coal | 7.7 |
| Finely ground unexpanded vermiculite | 7.7 |
| Diatomite | 7.7 |

EXAMPLE 2

| | Parts by weight |
|---|---|
| Coating asphalt | 61.5 |
| Asbestos fiber | 15.4 |
| Ground unexpanded vermiculite | 7.7 |
| Finely ground clay | 15.4 |

EXAMPLE 3

| | Parts by weight |
|---|---|
| Coating asphalt | 66.7 |
| Asbestos fiber | 16.7 |
| Ground bituminous coal | 8.3 |
| Limestone dust | 8.3 |

EXAMPLE 4

| | Parts by weight |
|---|---|
| Asphalt | 50.0 to 61.5 |
| Asbestos fiber | 8.4 to 20.0 |
| Ground bituminous coal | 12.5 to 15.5 |
| Finely ground mineral fillers | 7.5 to 25.0 |

In all of the examples of coatings given, it will be found that when they are applied to a saturated roofing felt, all will resist flowing and all will form a firm, strong crust when fired. It is not the intention to form a coating which has absolutely no flowability under heat, as it has been found desirable to have a slight amount of this action in order to close and seal the butt edge of the shingles against moisture, wind, etc. When the composition is burned the resulting crust is strongest before all of the organic matter has been burned out. However, the ash formed by any of the above examples will be found to be firm and strong to protect further the supporting structure.

The various ingredients are blended with the molten asphalt in the same manner as now used for incorporating fillers and in conventional equipment, though special equipment like a pug mill may be found more desirable.

The coating asphalt used in the above examples has a ring and ball softening point between 210 and 235° F. Other suitable varieties like the steep asphalt have a ring and ball softening point between 185 and 195° F., while the flux asphalt has a ring and ball softening point of 107° F. Other asphaltic materials such as Trinidad asphalt, coal tar pitch, stearine, and other pitches or mixtures thereof can be substituted for those given in these examples. Each source and type of asbestos, coal, filler, etc., used, may require some adjustment in the bituminous materials as to optimum softening range, but this also can readily be determined by those skilled in the art.

In a number of the formulas given above, vermiculite in unexpanded form has been used. This material must be handled carefully during the blending and coating stages, for it will exfoliate when heated too highly. However, it can be used, though other materials such as coking coals are preferred for a number of reasons.

While it has been found in preparing coating similar to the examples given above that clay and certain other ultrafine fillers give a slightly superior fire test performance than those of a coarser nature, yet, because of the matter of higher cost and greater difficulty of properly dispersing this type of powdered filler, it has been found more desirable in commercial practice to use the coarse, regular ground limestone filler. Any type of inorganic filler can be used by making a slight adjustment in the formula. However, it is preferred to use those which have been proven valuable in use in composition roof coatings.

It has been found that ground coal of certain properties and characteristics is extremely desirable in carrying out the purpose of this invention. This coal should be of a bituminous type. Any coal of this class, which is finely ground, such as about 100% through a 100 mesh screen, and having moderate to strong coking tendencies, can be used for the purpose. A coal known in the trade as the "Sewell seam coal" has been found to be very satisfactory and is the preferred material.

A typical analysis of this coal as given below, shows that it is a high volatile coal which is particularly characterized by its ability to coke into well formed, strong, nonbrittle agglutinated, coke lumps. It is also characterized by the property of swelling or expanding during the "coking" process. Though the Sewell seam of coal runs particularly in Fayette County, West Virginia, the same seam outcrops in other sections, and like the Pocahontas coal, is better known by the name of its geological deposit. Other coals possessing like characteristics may also be used, but the term Sewell seam coal as used herein, illustrates the preferred type of coal.

SEWELL SEAM COAL

*Typical analysis*

| | | |
|---|---|---|
| Moisture | per cent | 3.1 |
| Volatile | do | 22.4 |
| Fixed carbon | do | 7.2 |
| Ash | do | 4.3 |
| Sulfur | do | 0.1 |
| Heat value | B. t. u | 14,460 |

In order to obtain the optimum effectiveness in carrying out the principle of this invention, it has been found that very close attention is required to every detail, particularly as to the particle size and amount used of each ingredient. For example, it has been found that an accurate grading of the length and quantity of asbestos fiber used will result in improved properties of the coating formed. This coating has met the rigid requirements for the class "B" rating. This coating when applied to a mineralized type of roofing felt will even pass some of the requirements of class A. However, the following Example 5 was found to be even more successful in resisting cracking during the "Burning Brand" and other fire tests. This material will not crack at all after being subjected to the fire tests, and forms a continuous, strong, hard crust at all times.

EXAMPLE 5

| | Parts by weight |
|---|---|
| Asphalt (195-200 grade) | 50 |
| Ground coking coal (Sewell seam) | 14 |
| Asbestos fiber—6D grade | 10 |
| Asbestos fiber—7K grade | 6 |
| Limestone dust | 20 |

In the above examples wherever asbestos is used, grades substantially within the class known as 7K asbestos are intended. This grade is sometimes referred to as King's "D" brand. Amosite, a grade of African asbestos, is superior to the 7K type of asbestos in equivalent proportions, and is within the scope of the word asbestos as defined in this invention, for it is not the intention to limit the type of asbestos to 7K only as any equivalent asbestos or mixture of asbestos fillers may be used, for example, such as 6D or a mixture of a higher grade than 7K and a substantially lower grade, but obtaining 7K effect.

The terms 7K and 6D are the standard designations of grades set up by the Quebec Asbestos Producers Association. These grades are more fully set forth in the Canadian Department of Mines Bulletin 707 (1931), and are also described in the U. S. Bureau of Mines Bulletin 403 on Asbestos (1937) at page 70ff. According to this standard grades, a typical 7K fiber would screen as follows

0—0—2—14 and a typical 6D asbestos fiber would screen as follows

0—0—7—9

A standard sample (16 ounces) of asbestos is sifted successively through a nest of screens having openings ½ inch, 4 mesh, and 10 mesh. The first number represents the amount by weight of fiber retained on the ½ inch screen; the second number represents the amount by weight retained on the 4 mesh screen; the third represents the amount by weight retained on the 10 mesh screen, and the last number represents the amount in weight passing through the 10 mesh screen. These grades are distinctly fibrous in character. The Quebec Asbestos Producers Association have set up nine (9) groups of asbestos grades. Thus 6D is a grade D in the sixth group. The sixth group contains fibers used in stucco or plaster. The seventh group consists of fibers designated by letters such as 7K and still finer fibers designated by weight per cubic foot such as 7-20, which means that the fiber when loosely packed will weigh 20 pounds per cubic foot. The asbestos sand starts with a weight of 8-40 or it is in the eight group and weighs about forty pounds per cubic foot.

Thus 7K and letter designations are grades distinctly fibrous in character and far removed from the 8-40 classification. The table given below shows a typical laboratory testing screen analysis made on the fibers of asbestos of the grades 7K and 6D.

TABLE I

*Typical screen analysis*

| Type | 6D | 7K | 7T | 7RF |
|---|---|---|---|---|
| | Per cent | Per cent | Per cent | Per cent |
| Retained on 14 mesh | 19.0 | 8.0 | 0.6 | 0.5 |
| Retained on 48 mesh | 63.0 | 61.0 | 44.9 | 30.0 |
| Retained on 100 mesh | 5.0 | 6.0 | 11.0 | 20.5 |
| Retained on 200 mesh | 5.0 | 10.0 | 9.5 | 7.0 |
| Passing thru 200 mesh | 8.0 | 1.5 | 34.0 | 42.0 |

Any finely divided mineral powder, either cubical, needle-like or flake-like, having essentially the same or greater fineness and fineness modulus as limestone can be substituted therefor. By filler is meant any such materials which are in this class, preferably those ordinarily used in the asphalt roofing art.

In this application nomenclature and references to the various tests of the Underwriters' Laboratories are those in effect and in use about March 1, 1943.

To summarize, the essential principle of this invention is a coating composition made from an asphaltic type binder, a flow prevention material, and a crust forming material which does not liquify sufficiently under the application of a direct flame to flow from its base when placed on slopes up to 45 to 50 degrees and which retains in position protective granular materials during exposure to flame until substantially all of the organic binder composition is burned out. This composition will also form a hard, tough, continuous crust-like surface upon exposure to flame, and after a burn-out, a continuous cohesive ash capable of withstanding an air velocity of at least 12 miles per hour is formed. This protective ash coating further inhibits the spread of flame upon a roof surface even when the flame is fanned by wind up to 12 miles per hour. It will also resist cracking under thermal stresses and strains set up during the burning of brands or faggots on the surface of roofing covered with this coating composition. It not only protects the underlaying surfacing of combustible material from direct contact with flame, but also prevents cracks through which a draft of air might reach into and fan into open flame any glowing area under the ash.

Though the above examples are given as illustrations, it is obvious that various extensions and adaptations can readily be made without departing from the spirit and scope of the principles of this invention as defined in the hereunto appended claims.

It is claimed:

1. A weather and fire resistant bituminous coating composition for application to a felt base roofing sheet which comprises a vehicle consisting of a bituminous thermoplastic material having intumescible material selected from the group consisting of unexfoliated vermiculite and coking coals dispersed in said vehicle in sufficient quantity to reduce the flowability of the bituminous vehicle when it is subjected to flame conditions.

2. The product of claim 1 in which the said intumescible material is an unexpanded coking coal.

3. A bituminous coating composition for application to a felt base roofing sheet which comprises a vehicle consisting of a bituminous thermoplastic material having comminuted unexfoliated vermiculite dispersed therein in sufficient amount to reduce the flowability of the bituminous vehicle when it is subjected to flame conditions.

4. A weather and fire resistant bituminous coating composition for application to a felt base roofing sheet which comprises a vehicle consisting of a thermoplastic asphaltic material, having dispersed therein a filler which comprises a fibrous inorganic material and an intumescible crust forming material, which latter material is selected from the group consisting of unexfoliated vermiculite and coking coals, the said filler dispersed in said vehicle in sufficient amounts to prevent the flow of said thermoplastic, asphaltic material under the action of flame conditions.

5. The product of claim 4 in which the intumescible material is an unexpanded coking coal.

6. A bituminous coating composition for application to a felt base roofing sheet which comprises a vehicle consisting of a bituminous thermoplastic material having unexfoliated vermiculite and asbestos fibre dispersed therein in sufficient amounts to reduce the flowability of the bituminous vehicle when it is subjected to flame conditions.

7. A weather resistant, fire retardant coating composition comprising substantially the materials given below and substantially within the ranges given:

| | Per cent |
|---|---|
| Asphaltic material | 50.0 to 61.5 |
| Mineral fiber material | 8.0 to 20.0 |
| Intumescible material selected from the group consisting of unexpanded vermiculite and coking coals | 7.0 to 15.5 |
| Finely ground mineral filler | 7.5 to 25.0 |

8. The composition of claim 7 in which the said intumescible material is a coking coal.

9. The composition of claim 7, in which the said intumescible material is unexfoliated vermiculite.

10. The composition of claim 7 in which the said mineral fiber material is asbestos fiber selected from the group consisting of 6D and 7K grades.

11. In a fire retardant asphalt coating composition characterized by resistance to burning and flow when subjected to flame conditions applied to the said coating when the latter is maintained at an angle not greater than 50 degrees from the horizontal, a bitumen having a softening point of not less than about 185° F. when tested by the ring and ball method, the said bitumen being present in a quantity of not less than fifty per cent by weight of the said coating, the balance of said coating comprising not more than forty per cent of a comminuted asbestos fiber which all passes a four mesh screen and of which at least thirty per cent is retained on a forty-eight mesh screen, an intumescible mineral selected from the group consisting of unexpanded coking type bituminous coal and comminuted unexfoliated vermiculite, and a mineral filler conventionally used in the art.

12. In the product of claim 11 wherein at least fifty per cent of the quantity of comminuted asbestos fiber is retained on a 100 mesh screen.

13. In the product of claim 11 wherein the said intumescible material consists of Sewell seam coal as herein described, the said coal being comminuted to pass approximately 100 per cent through a 100 mesh screen.

14. The product of claim 11 in which the said intumescible mineral consists of unexfoliated vermiculite present in said coating in a quantity not less than 7.5 per cent by weight.

15. In a fire retardant asphalt coating composition characterized by resistance to fire and flow when subjected to flame conditions applied to the said coating composition when the latter is maintained at an angle not greater than fifty degrees from the horizontal, a bitumen having a softening point of not less than about 185° F. when tested by the ring and ball method, the said bitumen being present in a quantity of not less than fifty per cent by weight of said coating, the balance of said coating composition comprising not more than forty per cent by weight of a filler consisting of comminuted asbestos fiber which passes a four mesh screen, and of which at least thirty per cent is retained on a forty-eight mesh screen, and at least twenty-five per cent of said filler is a comminuted coking, intumescible type bituminous coal; and a mineral filler conventionally used by the roofing industry.

FRANK B. BURNS.
      M. S. LARRISON.

REFERENCES CITED

The following references are of record in the file of this patent:

UNITED STATES PATENTS

| Number | Name | Date |
|---|---|---|
| 2,113,794 | Leaute | Apr. 12, 1938 |
| 2,124,843 | Anderton | July 26, 1938 |
| 2,125,286 | Fletcher | Aug. 2, 1938 |
| 2,128,392 | Albion | Aug. 30, 1938 |
| 2,158,772 | Beckwith | May 16, 1939 |
| 2,214,904 | Johnson | Sept. 17, 1940 |
| 2,326,723 | Fasold et al. | Aug. 10, 1943 |
| 2,326,724 | Fasold et al. | Aug. 10, 1943 |
| 2,333,189 | McGrew | Nov. 2, 1943 |
| 2,356,870 | Miller | Aug. 29, 1944 |

FOREIGN PATENTS

| Number | Country | Date |
|---|---|---|
| 488,039 | Great Britain | June 30, 1938 |